United States Patent Office 2,847,394
Patented Aug. 12, 1958

2,847,394

COMPOSITIONS OF POLYEPOXIDE POLYESTERS AND AROMATIC SULFONAMIDE-ALDEHYDE CONDENSATES AND METHOD OF MAKING SAME

Sylvan O. Greenlee, Racine, Wis., assignor to S. C. Johnson & Son, Inc., Racine, Wis.

No Drawing. Application June 2, 1955
Serial No. 512,883

16 Claims. (Cl. 260—45.3)

This invention relates to new compositions resulting from the reaction of polyepoxide polyesters and sulfonamide-aldehyde condensates and includes the initial reaction mixtures as well as the intermediate and final reaction products derived therefrom. The polyepoxide polyesters used in preparing these new compositions are the polyepoxide polyesters which may be produced by epoxidizing the polyesters of tetrahydrophthalic acid and glycols. Reaction products derived from the reaction of these polyepoxide polyesters and sulfonamide-aldehyde condensates are valuable compositions for the manufacture of films, adhesives, coating compositions, molded articles, etc.

An object of this invention is to produce new compositions containing polyepoxide polyesters and sulfonamide-aldehyde condensates in such proportions that they may undergo further reaction by addition to form more highly polymerized products.

Another object of this invention is to produce new compositions of the hereinbefore described character which are prepared using polyepoxide polyesters which may be selected so as to have a relatively high degree of epoxidation.

Another object of this invention is to produce reaction produces from mixtures of polyepoxide polyesters and sulfonamide-aldehyde condensates which are valuable products in the manufacture of films, molded articles, coating compositions, etc., and which may be prepared so as to have good chemical resistance, flexibility, toughness, etc.

These and other objects and advantages are attained by the present invention, various other advantages and novel features of which will become more fully apparent from the following description, with particular reference to specific examples which are to be considered as illustrative only.

The polyepoxide polyesters used in this invention for reaction with the sulfonamide-aldehyde condensates may be conveniently prepared by epoxidizing the polyesters formed in the esterification of tetrahydrophthalic anhydride and glycols. The anhydride form of the acid is usually used since esterification proceeds easily with the anhydride and since the anhydride is readily available commercially although, of course, the acid form could be used. The polyesters may also be prepared by the reaction between glycols and simple esters of tetrahydrophthalic acid such as dimethyl or diethyl esters. This latter reaction would involve alcoholysis, or the displacing of the ethyl or methyl alcohol residue in the simple ester by the appropriate glycol.

Glycols which may be used in the preparation of the polyesters with tetrahydrophthalic anhydride include such glycols as ethylene glycol, diethylene glycol, tetramethylene glycol, propylene glycol, neopentyl glycol and hexamethylene glycol, as well as the longer-chain glycols such as the 36-carbon glycol prepared by the sodium or catalytic reduction of the simple esters of dimerized 18-carbon soyabean oil acids. Since with tertiary glycols there is a tendency for dehydration to occur under the conditions necessary for esterification with the subsequent formation of a double bond, generally the primary and secondary glycols are the most satisfactory in the polyester formation.

The degree of polymerization occurring during the polyester formation may be controlled by properly regulating the proportion of tetrahydrophthalic anhydride and glycol in the esterification reaction. Any excess acidity or hydroxyl content present in the polyester reaction mixture may be neutralized by reaction with a monofunctional alcohol or acid, respectively. By properly selecting the monofunctional reactant, slightly different properties may be given to the resulting polyester composition.

Polyepoxide polyesters may be prepared from these polyesters by epoxidizing the unsaturated portions of the tetrahydrophthalic acid residues in the polyester composition. These polyepoxide polyester compositions, as well as their preparation, are more fully described in a copending application having Serial No. 503,323, filed April 22, 1955.

The number of epoxide groups per molecule and the molecular weight of the polyepoxide polyester compositions may be controlled by adjusting the degree of polymerization which takes place, regulating the extent of the epoxidation of the polyester, and by proper selection of the glycol used in the esterification reaction with tetrahydrophthalic acid. For instance, the epoxidized polymer formed by epoxidizing the polyester of a long-chain glycol and tetrahydrophthalic anhydride would have a lower degree of epoxidation per given weight than the epoxidized polymer formed by epoxidizing the polyester prepared with a shorter-chain glycol; and the molecular weight of each of these compositions may be controlled by adjusting the degree of polymerization in the polyester formation. Polyepoxide polyester compositions having up to 12 or more epoxide groups per molecule have been found to be useful in formulating the compositions herein described. The polyepoxide polyesters used herein may have varying structures so long as they do not contain functional groups which interfere with the desired reaction of the polyepoxide and the sulfonamide-aldehyde condensate.

The condensates of sulfonamides and aldehydes which are used in this invention for reaction with the polyepoxide polyesters are the initial or intermediate condensation products formed in the reaction of aromatic sulfonamides, such as toluenesufonamide, with aldehydes, such as formaldehyde. Various aromatic sulfonamides and aldehydes, it is known, will react to form these condensation products.

Thus, in addition to toluenesulfonamide, other aromatic mononuclear sulfonamides or polynuclear sulfonamides, such as naphthalenesulfonamide or sulfonamides of aromatic polynuclear ethers, will react with aldehydes to form condensation products. Likewise, monofunctional sulfonamides as well as polyfunctional sulfonamides may be used.

The degree of condensation may be varied so long as the reactants have not been condensed to a completely insoluble or infusible form. In the prepartion of certain compositions, it may be advantageous to use the original alkylol form of the condensate which has been condensed very little and is still soluble in most common solvents. Even at this limited stage of condensation, the melting point of the condensate is relatively high as compared to condensates of aldehydes and such materials as phenols, urea, or thiourea. Since polyfunctional sulfonamides tend to yield infusible products after any appreciable condensation, in most cases with these sulfonamides it is desirable to use the condensate when the condensate is still in the alkylol form and condensed only slightly.

The condensates of aromatic sulfonamides and aldehydes which may be used in this invention are those condensates which contain active hydrogen, these active hydrogens apparently entering into a reaction with the epoxide groups of the polyepoxide polyesters to form more highly polymerized compositions. These active hydrogens may be part of the hydroxyl groups formed in the condensation reaction, or they may be amidic active hydrogen, i. e., hydrogen attached to the nitrogen of the sulfonamide. Nitrogen monosubstituted and unsubstituted sulfonamides, i. e., sulfonamides having one and two amidic hydrogen atoms, respectively, will condense with aldehydes to form condensates having these active hydrogens. In the case of monosubstituted sulfonamides, there would be no amidic active hydrogen in the condensate since in the condensation reaction the single hydrogen atom is removed from the amidic group. In the case of condensates of this type, it is usually advantageous to use more highly reactive polyepoxide polyesters in the reaction with the condensate to obtain converted compositions.

The reactivity of the polyepoxide polyesters used in this invention depends to a certain extent on the equivalent weight of the composition per an epoxide group. Those polyepoxide polyesters having a low equivalent weight per epoxide group, i. e., those compositions which have a high degree of epoxidation, are usually more reactive in the reaction with sulfonamide-aldehyde condensates than those polyepoxide polyesters having a higher equivalent weight per epoxide group. By properly selecting a polyepoxide polyester, a polymerized product may be readily obtained in the reaction with the sulfonamide-aldehyde condensates. Since polyepoxide polyesters having up to 12 or more epoxide groups per molecule are available, an opportunity is provided for several linear polyepoxide polyester chains to interact with each other and to react with the sulfonamide-aldehyde condensates to produce a net-like, cross-linked structure which is insoluble and infusible.

In forming the condensation products, catalysts may be added provided, however, that the catalyst will not unduly interfere with the subsequent reaction of the condensate with the polyepoxide polyester to form the more highly polymerized products.

The reactions which take place between the sulfonamide-aldehyde condensate and the polyepoxide polyester are quite complex, and it is desired not to limit this invention by any theoretical explanation of the nature of the reactions which take place. However, it seems probable that in addition to the reaction between the epoxide groups of the polyepoxide and the active hydrogens of the sulfonamide-aldehyde condensate, there is further condensation of the sulfonamide-aldehyde condensate itself to form more highly polymerized products. Also, it seems likely that there be a reaction between epoxide groups present with active hydrogen contained by hydroxyl groups formed in the epoxide in the course of the reaction of epoxide groups with other active hydrogens. These reactions may take place at various rates of reaction, to yield a polymerized product which is valuable in the manufacture of coating compositions, molded articles, adhesives, etc.

In preparing the new compositions of this invention, the sulfonamide-aldehyde condensate and the polyepoxide polyester resins may be used with each other in regulated proportions and without the addition of other materials. However, other constituents may be admixed with the compositions of this invention, such as filling and compounding materials, plasticizers, pigments, etc. The method of blending these constituents together with the polyepoxide polyesters and sulfonamide-aldehyde condensates will depend on properties such as the softening point of the various materials.

Constituents which may be used to give somewhat varied products may be inert-type constituents, i. e., they may be free of functional groups as illustrated by such plasticizers as high-boiling point esters which are compatible with the mixtures of sulfonamide-aldehyde condensates and polyepoxide polyesters. However, these constituents may contain functional groups and, therefore, enter into the reaction with the resin mixtures of this invention and be carried chemically by them. Such a constituent can be illustrated by the epoxidized simple esters of unsaturated fatty acids which are by-products of the animal fat and vegetable oil industry. These plasticizer materials would tend to react with the sulfonamide-aldehyde condensate in a manner similar to the polyepoxide polyester resin. Because of the low epoxide content of this material, however, reaction with these plasticizers would tend to terminate the polymerization reaction. Since the polyepoxide polyesters used in this invention may be selected so as to have a high degree of epoxidation, constituents having functional groups may be used most readily to form insoluble, cross-linked structures which are the novel compositions of this invention.

The method of blending together the sulfonamide-aldehyde condensate and the polyepoxide resin will depend somewhat on their properties, for example, softening points. It is often most convenient to use the sulfonamide-aldehyde condensate in a syrupy state in order that it will mix readily with the polyepoxide resin. Many of the epoxidized polyester resins are soft, somewhat syrupy in texture, so that mixtures can easily be made. In the case of higher melting products, it may be desirable to melt the materials and make mixtures at temperatures considerably above room temperature. In the preparation of mixtures for the manufacture of molded objects, the molten combination of resins along with any converting agent which may be used could be poured directly into the molds. In the formulation of materials for application as a protective coating, it is often desirable to dissolve the mixture of the two types of resins along with any converting agent that is to be used in a volatile solvent. This solvent solution can be adjusted to the proper nonvolatile content to give a conveniently working viscosity for application.

Converting agents which may be used to induce polymerization of the resin mixture include Friedel-Crafts type catalysts such as boron trifluoride, often referred to as Lewis acids. Since boron trifluoride is found to be extremely reactive in promoting these reactions, latent type boron trifluoride catalysts are usually used, this type of catalyst liberating boron trifluoride upon the application of heat. Alternatively, polybasic acids and polybasic anhydrides may be used as converting agents. These acid materials are coupling-type converting agents containing active hydrogen and will take part in the reaction with epoxide groups to produce more highly polymerized products. These active hydrogen containing converting agents include such acid materials as maleic anhydride, phthalic anhydride, aconitic acid and thiomalic acid.

It is not necessary to use a converting agent such as the catalyst or coupling-type converting agents described herein, due to the fact that the epoxide groups apparently react with the active hydrogen in the sulfonamide-aldehyde condensate. When no converting agents are used, the temperatures of reaction may have to be elevated somewhat or the heating period may have to be lengthened in order that complete conversion may take place.

It is sometimes desirable to partially react the mixtures of sulfonamide-aldehyde resins and epoxidized polyester resins before final heat conversion of the mixture to more complex reaction products. For example, one might start off with a syrupy mixture of the products, apply heat until the softening point has been raised well above room temperature, and dissolve this mixture in a suitable solvent in order to prepare a protective coating formulation. This would provide a material from which films could be prepared which would be essentially tack-free on evaporation of the solvent, yet would be soluble and fusible at this stage. Further application of heat to these films would then convert them to insoluble, infusible form.

It will be seen that the present invention includes a wide range of compositions including initial mixtures of sulfonamide-aldehyde resins and polyepoxide polyester resins, partial or intermediate reaction products of such mixtures and compositions containing such intermediate reaction products, as well as final reaction products. Compositions containing reactive expoxide groups may be reacted with other cross-linking agents containing active hydrogen, which are capable of reaction with an epoxide group, and which, in addition, catalyze the polymerization of the sulfonamide-aldehyde condensate to give a more complex product.

The final conversion products of this invention may be prepared with outstanding physical properties such as toughness and flexibility. They may also be prepared so as to have high chemical resistance, and, therefore, be well suited for such applications as protective coating formulations where films are desired which have high resistance to oxidation, water, and common reagents.

The following examples will serve to illustrate the invention, however, it should be understood that the invention is not intended to be limited thereby. In these preparations, proportions expressed are parts by weight unless otherwise indicated.

The nonvolatile content of the polyesters and the polyepoxide polyesters was obtained by heating these compositions in a vacuum oven for 3 hours at 150° C. The nonvolatile content of the other compositions as used herein was obtained by heating the composition in a vacuum oven for 3 hours at 110° C.

Example I illustrates the preparation of a sulfonamide-aldehyde condensate from p-toluenesulfonamide and formaldehyde.

*Example I*

1370 parts of p-toluenesulfonamide and 640 parts of 37% aqueous formaldehyde was placed in a 3-liter, 3-neck flask provided with mechanical agitator, thermometer, and reflux condenser. The pH of the formaldehyde solution had been previously adjusted to 6.0 with potassium acid phthalate and sodium hydroxide. With continuous agitation, the reaction mixture was heated to reflux temperature over a period of 40 minutes, and the refluxing continued for a period of 15 minutes. At this point the reaction mixture was allowed to cool and the water decanted from the resin. The resin was washed three times with warm water and finally dehydrated in a vacuum of approximately 30–50 mm. pressure, using a flask temperature of from 70° to 90° C. The product, amounting to 1245 parts, was a water white, resinous solid.

Examples II, III, and IV illustrate the preparation of polyesters using tetrahydrophthalic anhydride and glycols.

*Example II*

A mixture of 1.1 mol tetrahydrophthalic anhydride and 0.2 mol n-butanol was placed in a 3-necked flask provided with a thermometer, a mechanical agitator, and reflux condenser attached through a water trap. After melting the tetrahydrophthalic anhydride in the presence of the butanol, 1 mol of 1,4-butanediol was added. The reaction mixture was gradually heated with agitation to 225° C. at which point a sufficient amount of xylene was added to give refluxing at esterification temperature. The reaction mixture was then heated with continuous agitation at 225–235° C. until the acid value decreased to 8.6, a period of about 24 hours. Acid value as herein described represents the number of milligrams of KOH equivalent to the acidity present in a one-gram sample. The product was a highly viscous, tacky solid having slight flow at room temperature, and an iodine value of 93.

*Example III*

Using the procedure of Example II, a polyester resin was prepared from 3 mols of tetrahydrophthalic anhydride, 2 mols of ethylene glycol, and 2 mols of n-butanol. The product had an iodine value of 100 and an acid value of 4.

*Example IV*

Using the procedure of Example II, a polyester resin was prepared from 1.1 mols of tetrahydrophthalic anhydride, 1 mol of diethylene glycol, and 0.2 mol of n-butanol. The product had an acid value of 3.9 and an iodine value of 101.

Examples V, VI, and VII illustrate the epoxidation of the polyesters of Examples II–IV.

*Example V*

A dehydrated acid form of a cation exchange resin (Dowex 50X–8, 50–100 mesh, Dow Chemical Company, the sodium salt of a sulfonated styrene divinylbenzene copolymer containing 8% divinylbenzene, illustrated by the formula $RSO_3^-Na^+$ where R represents the hydrocarbon network of the polymer) was prepared by washing the resin several times with 4 to 6 normal hydrochloric acid, washing the neutralized resin with distilled water to remove excess acid and inorganic salt, and drying the product in a vacuum over at a temperature of about 80° C. for a period of approximately 16 hours.

107 parts of the dehydrated acid form of cation exchange resin and 30 parts glacial acetic acid was placed in a 3-necked flask provided with a thermometer, a mechanical agitator, and a reflux condenser. The mixture of cation exchange resin and acetic acid was allowed to stand until the resin had completely taken up the acid.

To this mixture was added 273 parts nonvolatile of the polyester resin of Example II dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. In some preparations involving other polyester resins, sufficient exothermic heat is produced during the addition of hydrogen peroxide so that no external heat is required, or even some external cooling may be required. The reaction was continued at 60° C. until a milliliter sample of the reaction mixture analyzed less than 1 mililiter of 0.1 N sodium thiosulfate in an iodometric determination of hydrogen peroxide. The product was then filtered, finally pressing the cation exchange resin filter cake. The acid value of the total resin solution was 56.9. The percent nonvolatile of this solution, amounting to 559 parts, was 50.

A dehydrated basic form of a salt-splitting, amine type anion exchange resin (Dowex I, Dow Chemical Company, quaternary ammonium chloride salt of an aminated styrene divinylbenzene copolymer of 20–50 mesh containing about 8% divinylbenzene, illustrated by the formula $RR'_3N^+Cl^-$ where R represents the hydrocarbon network and R' is a methyl group) was prepared by washing the exchange resin several times with alkali, washing the neutralized resin with distilled water to remove excess alkali and inorganic salt, and drying the product in a vacuum oven at a temperature of about 80° C. for a period of approximately 16 hours.

The 559 parts of solution was thoroughly mixed with 175 parts of the dehydrated basic form of anion exchange resin. The resulting mixture was then filtered, followed by pressing as much of the solution as possible from the anion exchange resin cake. This product had an acid value of 10.1 on the nonvolatile resin content and an epoxide equivalent (equivalent weight to epoxide group) of 304 on the nonvolatile resin content.

The epoxide values as discussed herein were determined by refluxing for 30 minutes a 2-gram sample with 50 milliliters of pyridine hydrochloride in excess pyridine. The pyridine hydrochloride solution was prepared by adding 20 milliliters of concentrated HCl to a liter of pyridine. After cooling to room temperature, the sample is then back-titrated with standard alcoholic sodium hydroxide.

This resin solution is satisfactory for many uses, such as blending with active hydrogen compositions to make coating resin solutions ready for application. In cases where the solvent-free resin is desired, the solvent may be readily removed by distillation, preferably at reduced pressure under conditions where the temperature does not rise above around 60° C.

*Example VI*

252 parts nonvolatile of the polyester resin of Example III was epoxidized in accordance with the procedure given in Example V to give a product having an acid value of 6 on the nonvolatile content, and an epoxide equivalent on the nonvolatile content of 268.

*Example VII*

250 parts nonvolatile of the polyester resin of Example IV was epoxidized in accordance with the procedure given in Example V to give a product having an acid value of 13.2 and an epoxide equivalent of 314, both values based on the nonvolatile content.

The following examples illustrate the preparation of insoluble, infusible products using aromatic sulfonamide-aldehyde condensate and polyepoxide polyester resins. While it is not necessary that a solvent be used in these examples, the two resins in the examples were dissolved in an equal weight of a lacquer-type solvent composed of 1 part methylisobutyl ketone and 2 parts xylene, in order to give a solution which could readily be used in the preparation of films.

*Example VIII*

Films were prepared from a reaction mixture of 304 parts of the nonvolatile product of Example V and 152 parts of the nonvolatile product of Example I. When cured for 30 minutes at 175° C. the films became hard and flexible, and withstood without deterioration 5% aqueous sodium hydroxide for 5 hours, and boiling water for 8 minutes.

When 50 parts of the converting agent, thiomalic acid, was added to this reaction mixture, films prepared from the reaction mixture could be cured by heating the films for 30 minutes at 150° C. These films withstood boiling water for 2 hours without deterioration.

*Example IX*

Films were prepared from a reaction mixture of 304 parts of the nonvolatile product of Example V, 75 parts of the nonvolatile product of Example I, and 50 parts of thiomalic acid. When cured for 30 minutes at 150° C., the films became hard and flexible and withstood boiling water for 6 hours without deterioration.

*Example X*

Films were prepared from a reaction mixture of 314 parts of the nonvolatile product of Example VII, 157 parts of the nonvolatile product of Example I, and 50 parts thiomalic acid. When cured for 30 minutes at 150° C., the films became hard and flexible, and withstood boiling water for 5 hours without deterioration.

When a reaction mixture was prepared reducing the amount of Example I to 79 parts of the nonvolatile product of Example I, flexible films were obtained on curing for 30 minutes at 150° C. which withstood without deterioration boiling water for 5 hours.

*Example XI*

Films prepared from 268 parts of the nonvolatile product of Example VI and 134 parts of the nonvolatile product of Example I, cured at 175° C. for 30 minutes were hard and flexible, and withstood boiling water without deterioration for 2 hours.

*Example XII*

Films prepared from 304 parts of the nonvolatile product of Example V and 75 parts of the nonvolatile product of Example I, using 6 parts of the converting agent, boron trifluoride-triethanolamine complex, were cured at 175° C. for 30 minutes. These films were hard and flexible, and withstood 5% aqueous sodium hydroxide for a period of 55 hours, and boiling water for 3 hours.

In a similar manner, other compositions and reaction mixtures may be prepared using other aromatic sulfonamide-aldehyde condensates, and other polyepoxide polyesters of tetrahydrophthalic acid and glycols. These mixtures can be prepared using converting agents such as described herein, or without the presence of any converting agents. When a converting agent is present, conversion can usually be obtained under slightly milder conditions of reaction.

Other modifying materials may also be used in making the new compositions of this invention. Thus it may be desirable to admix with the herein described compositions other resinous materials, such as alkyd resins, to obtain slightly modified compositions.

The examples herein have illustrated primarily the formation of protective coating films, although, of course, it is obvious from the converting characteristics of these compositions as well as from the chemical resistance shown, that these compositions are valuable in other applications such as in the formulation of adhesives or molding materials. In the production of molded articles, it would not ordinarily be desirable to use a considerable amount of solvent, as the resinous materials could be mixed directly and then placed into a mold. In the case of certain adhesives, it may sometimes be desirable to use a solvent in the reaction mixture while in other cases the use of a solvent may be undesirable.

As used herein, "epoxy oxygen" refers to the —O— bridge in an epoxide composition typically illustrated by the following:

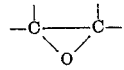

While various embodiments of the invention have been described, it should be understood that the invention is not restricted thereto, and that it is intended to cover all modifications of the invention which would be apparent to one skilled in the art and that come within the scope of the appended claims.

It is claimed and desired to secure by Letters Patent:

1. Reaction mixtures useful in the production of more highly polymerized reaction products comprising polyepoxide polyesters of tetrahydrophthalic acid and glycols, said polyesters containing epoxide groups formed by replacing one bond of the olefin linkage of tetrahydrophthalic acid with epoxy oxygen, and active hydrogen-containing condensates of aromatic sulfonamides and aldehydes.

2. Reaction mixtures useful in the production of more highly polymerized reaction products comprising fusible polyepoxide polyesters of tetrahydrophthalic acid and glycols, said polyesters containing epoxide groups formed by replacing one bond of the olefin linkage of tetrahydrophthalic acid with epoxy oxygen, and fusible active hydrogen-containing condensates of aromatic sulfonamides and aldehydes.

3. The reaction mixtures claimed in claim 2 and further comprising converting agents of the group consisting of polycarboxylic acids, polycarboxylic acid anhydrides, and boron trifluoride.

4. Reaction mixtures useful in the production of more highly polymerized reaction products comprising lacquer solvent solutions of polyepoxide polyesters of tetrahydrophthalic acid and glycols, said polyesters containing epoxide groups formed by replacing one bond of the olefin linkage of tetrahydrophthalic acid with epoxy oxygen, and active hydrogen-containing condensates of aromatic sulfonamides and aldehydes.

5. Reaction mixtures useful in the production of more highly polymerized reaction products comprising polyepoxide polyesters of tetrahydrophthalic acid and glycols, said polyesters containing epoxide groups formed by replacing one bond of the olefin linkage of tetrahydrophthalic acid with epoxy oxygen, and active hydrogen-containing condensates of aromatic sulfonamides and aldehydes, said mixtures containing from 1 to 4 parts of said polyepoxide polyesters to 1 part of said condensates.

6. Reaction mixtures useful in the production of more highly polymerized reaction products comprising fusible polyepoxide polyesters of tetrahydrophthalic acid and glycols, said polyesters containing epoxide groups formed by replacing one bond of the olefin linkage of tetrahydrophthalic acid with epoxy oxygen, and fusible active hydrogen-containing condensates of aromatic sulfonamides and aldehydes, said mixtures containing from 1 to 4 parts of said polyepoxide polyesters to 1 part of said condensate.

7. Reaction mixtures useful in the production of more highly polymerized reaction products comprising polyepoxide polyesters of tetrahydrophthalic acid and glycols, said polyesters containing epoxide groups formed by replacing one bond of the olefin linkage of tetrahydrophthalic acid with epoxy oxygen, and an active hydrogen-containing condensate of p-toluenesulfonamide and formaldehyde.

8. The reaction mixtures claimed in claim 7 and further comprising converting agents of the group consisting of polycarboxylic acids, polycarboxylic acid anhydrides, and boron trifluoride.

9. Reaction mixtures useful in the production of more highly polymerized reaction products comprising polyepoxide polyesters of tetrahydrophthalic acid and glycols, said polyesters containing epoxide groups formed by replacing one bond of the olefin linkage of tetrahydrophthalic acid with epoxy oxygen, and an active hydrogen-containing condensate of p-toluenesulfonamide and formaldehyde, said mixtures containing from 1 to 4 parts of said polyepoxide polyesters to 1 part of said condensate.

10. Reaction mixtures useful in the production of more highly polymerized reaction products comprising lacquer solvent solutions of polyepoxide polyesters of tetrahydrophthalic acid and glycols, said polyesters containing epoxide groups formed by replacing one bond of the olefin linkage of tetrahydrophthalic acid with epoxy oxygen, and active hydrogen-containing condensates of p-toluenesulfonamide and formaldehyde.

11. The reaction mixtures of claim 10 and further comprising converting agents of the group consisting of polycarboxylic acids, polycarboxylic acid anhydrides, and boron trifluoride.

12. A method of forming complex reaction products which comprises heating a mixture of polyepoxide polyesters of tetrahydrophthalic acid and a glycol, said polyesters containing epoxide groups formed by replacing one bond of the olefin linkage of tetrahydrophthalic acid with epoxy oxygen, and active hydrogen-containing condensates of aromatic sulfonamides and aldehydes, so as to convert the mixture into more highly polymerized products.

13. A method of forming complex reaction products which comprises heating a mixture of polyepoxide polyesters of tetrahydrophthalic acid and glycol, said polyesters containing epoxide groups formed by replacing one bond of the olefin linkage of tetrahydrophthalic acid with epoxy oxygen, and active hydrogen-containing condensates of p-toluenesulfonamide and formaldehyde, so as to convert the mixture into more highly polymerized products.

14. Infusible reaction products resulting from heating a mixture comprised of polyepoxide polyesters of tetrahydrophthalic acid and glycols, said polyesters containing epoxide groups formed by replacing one bond of the olefin linkage of tetrahydrophthalic acid with epoxy oxygen, and active hydrogen-containing condensates of aromatic sulfonamides and aldehydes.

15. Infusible reaction products resulting from heating a mixture of polyepoxide polyesters of tetrahydrophthalic acid and glycols, said polyesters containing epoxide groups formed by replacing one bond of the olefin linkage of tetrahydrophthalic acid with epoxy oxygen, and active hydrogen-containing condensates of p-toluenesulfonamide and formaldehyde.

16. The reaction products of claim 15 wherein said mixtures contain from 1 to 4 parts of said polyepoxide polyesters to 1 part of said condensate.

References Cited in the file of this patent

UNITED STATES PATENTS

| 1,912,554 | Walsh | June 6, 1933 |
| 2,591,539 | Greenlee | Apr. 1, 1952 |
| 2,660,563 | Banes et al. | Nov. 24, 1953 |
| 2,720,500 | Cody | Oct. 11, 1955 |

OTHER REFERENCES

"Plasticizers and Resins," Bulletin of Monsanto Chem. Co., revised edition of May 1940, pages 28–30.

"Epon Resins," Technical Bulletin SC: 52–31, Shell Chem. Corp., 1952, pages 7 and 10.